United States Patent
Hayes et al.

(10) Patent No.: US 10,621,216 B2
(45) Date of Patent: *Apr. 14, 2020

(54) GENERATING A RANKED LIST OF BEST FITTING PLACE NAMES

(71) Applicant: International Business Machines Corporation, Armonk, NY (US)

(72) Inventors: Jeremiah P. Hayes, Dublin (IE); Raymond Lloyd, Meath (IE); William Karol Lynch, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 455 days.

This patent is subject to a terminal disclaimer.

(21) Appl. No.: 15/444,392

(22) Filed: Feb. 28, 2017

(65) Prior Publication Data

US 2018/0246906 A1 Aug. 30, 2018

(51) Int. Cl.
*G06F 16/29* (2019.01)
*G06F 7/24* (2006.01)
*G06F 16/23* (2019.01)
*G06F 16/35* (2019.01)

(52) U.S. Cl.
CPC ............ *G06F 16/29* (2019.01); *G06F 7/24* (2013.01); *G06F 16/2365* (2019.01); *G06F 16/35* (2019.01)

(58) Field of Classification Search
CPC ........ G06F 16/29; G06F 16/35; G06F 16/285; G06F 7/24; G06K 9/6223
USPC ................................................ 707/737, 780
See application file for complete search history.

(56) References Cited

U.S. PATENT DOCUMENTS

| | | | |
|---|---|---|---|
| 7,257,570 B2 | 8/2007 | Riise et al. | |
| 7,668,651 B2 | 2/2010 | Searight et al. | |
| 7,779,059 B2 | 8/2010 | Bourland, II et al. | |
| 8,078,601 B1 | 12/2011 | Egnor et al. | |
| 2006/0149742 A1 | 7/2006 | Egnor | |
| 2008/0016055 A1 | 1/2008 | Riise et al. | |

(Continued)

OTHER PUBLICATIONS

IBM, "Maintaining Cluster Aliases on Servers in a Heterogeneous Environment", IP.Com Prior Art Database, IPCOM000011768D (2003).

(Continued)

*Primary Examiner* — Marcin R Filipczyk
(74) *Attorney, Agent, or Firm* — Kurt Goudy; Otterstedt, Wallace & Kammer, LLP

(57) ABSTRACT

A method of updating a plurality of databases storing place names includes collecting first, second and third coordinates of addresses including a first, a second and a third place name, respectively, clustering the first, second and third coordinates in a first, a second and a third cluster, respectively, obtaining a base address including the first place name and having base coordinates, assessing the best fit of the base coordinates to the first, second, and third clusters, and based on the two best fit clusters, identifying the second or third place name as an alias place name for the first place name. The method further includes obtaining alias addresses including the alias place name, fuzzy matching the base address to an alias address, and updating first and second databases by linking the alias address in the second database to the base address in the first database.

13 Claims, 7 Drawing Sheets

(56) References Cited

U.S. PATENT DOCUMENTS

| | | | |
|---|---|---|---|
| 2009/0170538 A1* | 7/2009 | Shrivathsan | H04W 4/18 |
| | | | 455/466 |
| 2012/0197724 A1 | 8/2012 | Kendall | |
| 2017/0109373 A1* | 4/2017 | Sung | G06N 7/005 |
| 2018/0232840 A1* | 8/2018 | Liu | G06F 7/08 |

OTHER PUBLICATIONS

Saliba et al., "Dynamic clustering of service technicians and service requests in workforce scheduling", IP.Com Prior Art Database, IPCOM000237139D (2014).

Mell et al., "The Nist Definition of Cloud Computing". Special Publication 800-145. Sep. 2011, pp. 1-7.

Christen et al., "A Probabilistic Geocoding System based on a National Address File", Proceedings of the Australasian Data Mining Conference, Cairns, Dec. 2004, pp. 1-12.

Christen et al., "A Probabilistic Fuzzy Geocoding System based on a National Address File", https://cs.anu.edu.au/people/Peter.Christen/publications/ai2004.pdf, Apr. 2009, pp. 1-12.

IBM, "Method and System of Fuzzy Find/Replace", IP.com Prior Art Database, IPCOM000188608D, Oct. 15, 2009, pp. 1-4.

Jeremiah P. Hayes et al., unpublished U.S. Appl. No. 15/859,563, filed Dec. 31, 2017, Generating a Ranked List of Best Fitting Place Names, pp. 1-24 plus 7 sheets of drawings.

Paul J. Otterstedt, List of IBM Patents or Patent Applications Treated As Related, .Jun. 28, 2018, pp. 1-2.

\* cited by examiner

GENERATING A RANKED LIST OF BEST FITTING PLACE NAMES

BACKGROUND

The present invention relates to the electrical, electronic, and computer arts, and more specifically, to address databases.

Electronic navigation systems specify streets and roads in terms of geographical coordinates of their endpoints and intersections with other streets and roads. The electronic navigation systems develop directions between origin and destination street addresses based generally on traversing a sequence of road-and-street geographical coordinates that form a shortest route between the geographical coordinates of the input origin and destination street addresses. Thus, in order to obtain the geographic coordinates of the origin and destination street addresses ("geocoding"), the electronic navigation systems rely on address databases that correlate geographic coordinates to street addresses. These address databases also are useful for other purposes, e.g., demographic data collection, marketing campaigns, epidemiology, etc.

SUMMARY

There may be multiple address databases a first of which has GPS coordinates correlated to addresses and a second of which has only addresses and other data (e.g., demographic data or epidemiologic data). In such case it is helpful to correlate the addresses of the second database to those of the first database, thereby making the GPS coordinates accessible for use with the second database in order to permit mapping the data of the second database. However, in the first and second databases there may be entries with different addresses (different place names) that nevertheless correspond to the same premises and geographic coordinates. For example, this can be the case when premises could be located in either of two overlapping neighborhoods (e.g., "Edgecliff" and "Double Bay" are two neighborhoods that overlap each other within the city of Sydney Australia; "Astoria" is part of the borough of "Queens" in New York City), or when the municipality itself is misspelt (e.g., "Sydney" spelt as "Sidney").

Principles of the invention provide techniques for generating a ranked list of best fitting place names. In one aspect, an exemplary method includes the use of clustering to generate place name clusters, a scoring function for choosing the best matching clusters, and a validation step for verifying that two clusters are in fact aliases (cluster similarity measure). Thus, the method includes collecting from a first database a plurality of first geographic coordinates corresponding to a plurality of first addresses that include a first place name; collecting from the first database a plurality of second geographic coordinates corresponding to a plurality of second addresses that include a second place name; and collecting from the first database a plurality of third geographic coordinates corresponding to a plurality of third addresses that include a third place name. Additionally, the exemplary method includes geographically clustering the plurality of first geographic coordinates in at least one first cluster; geographically clustering the plurality of second geographic coordinates in at least one second cluster; and geographically clustering the plurality of third geographic coordinates in at least one third cluster. The exemplary method further includes obtaining from the first database a base address including the first place name and having base coordinates; assessing the best fit of the base coordinates to the first, second, and third clusters; and based on the two best fit clusters, identifying the second or third place name as an alias place name for the first place name. The exemplary method further includes obtaining from a second database, which does not include geographic coordinates, a fourth plurality of addresses including the alias place name; fuzzy matching the base address to an alias address among the fourth plurality of addresses; and producing updated versions of the first and second databases by linking the alias address in the second database to the base address in the first database.

An exemplary embodiment of the invention is a non-transitory computer readable medium including computer executable instructions which when executed by a computer cause the computer to perform the exemplary method.

One or more embodiments of the invention can be implemented in the form of an apparatus that includes a memory and at least one processor that is coupled to the memory and operative to implement the exemplary method.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments provide one or more of:

Improved quality of address matching results.
Automated handling of moveable region borders.

These and other features and advantages of the present invention will become apparent from the following detailed description of illustrative embodiments thereof, which is to be read in connection with the accompanying drawings.

DETAILED DESCRIPTION

Figure 1:
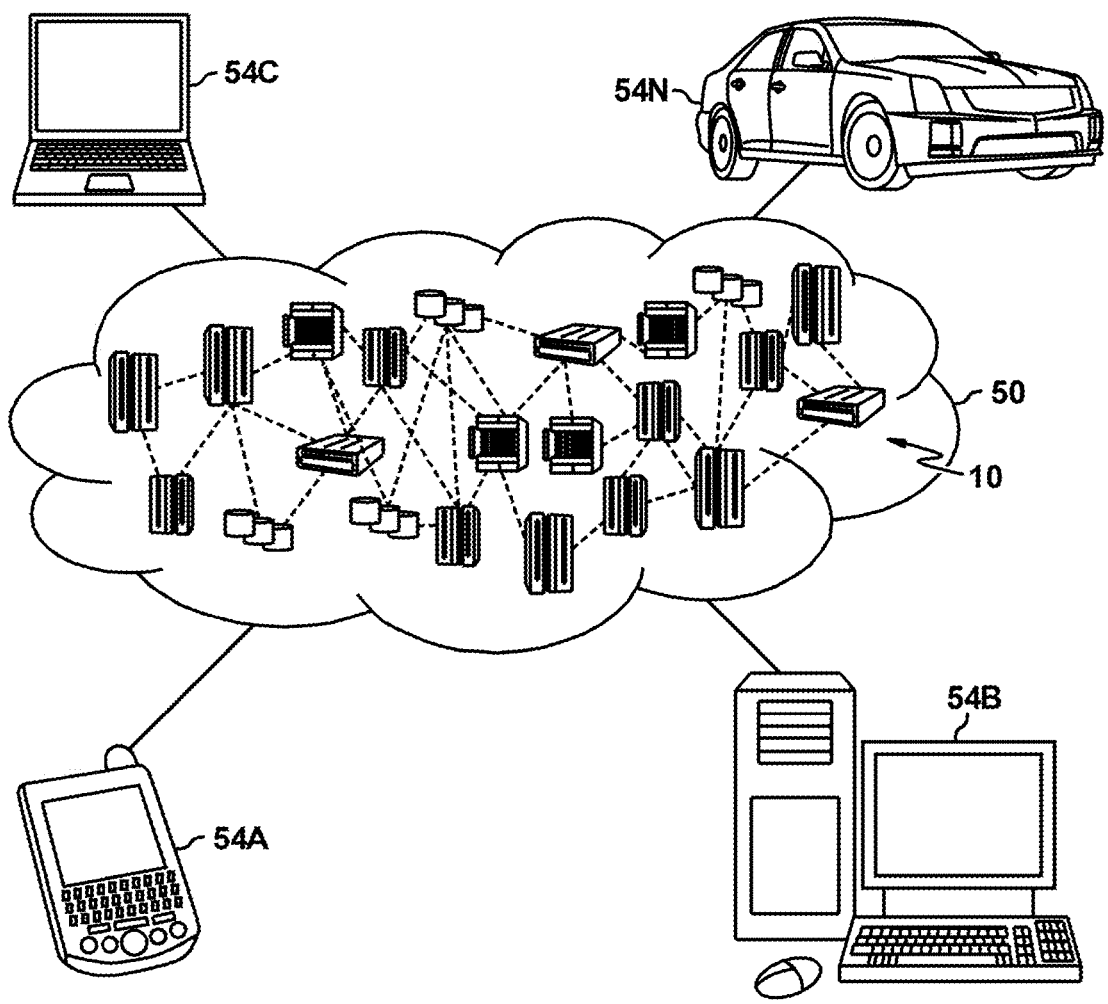
FIG. 1 depicts a cloud computing environment according to an embodiment of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
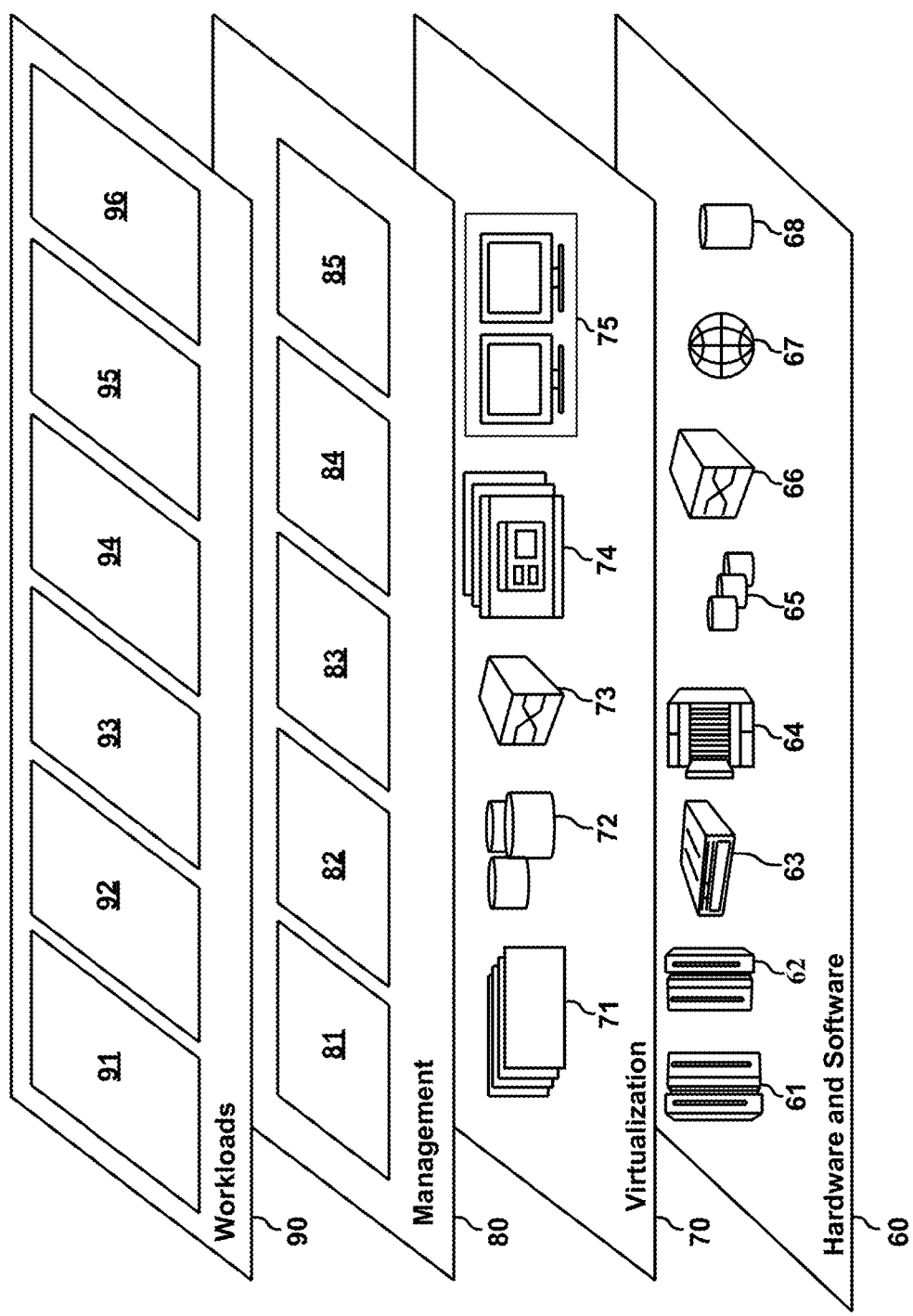
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and address matching 96.

Figure 3:
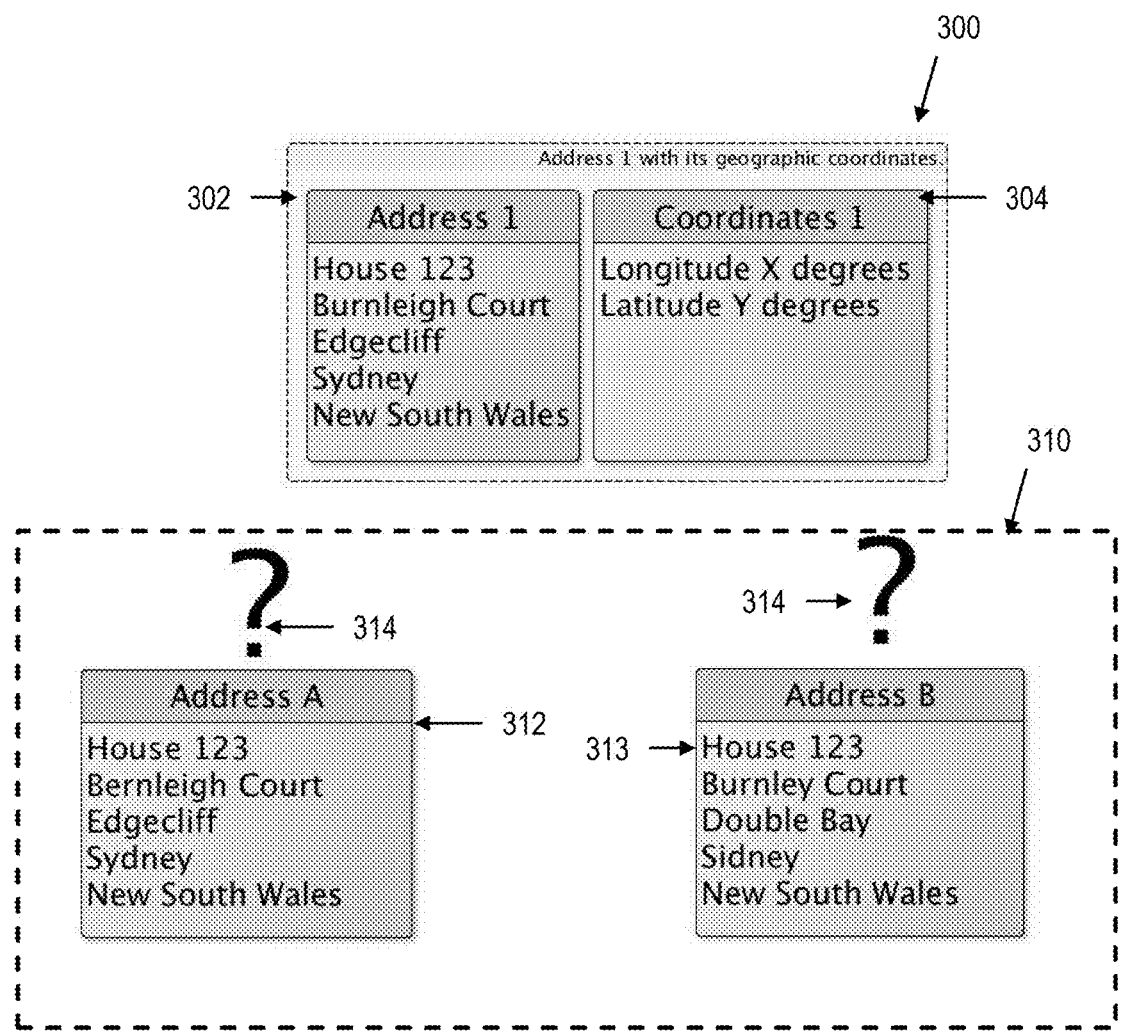
FIG. 3 illustrates an address matching problem.

Referring to FIG. 3, the invention is intended to resolve a problem in the matching of street addresses among multiple databases. A first database 300 has a first street address (base address) 302 that is associated with a first set of geographic coordinates (base coordinates) 304. The base address 302 includes several place names at different geographic levels, i.e. a house number, a street name, a neighborhood, and a municipality. A second database 310 has second and third street addresses 312, 313 that are not associated with geographic coordinates. Either of the second or third street addresses 312, 313 might be an alias address 314 of the base address 302, in other words, might refer to the same premises. In case the alias address 314 existed, then it would become possible to link all the data associated with the base address 302, including the base coordinates 304, to the alias address 314. Such a linkage of data would significantly enhance the usefulness of the second database 310.

Each of the street addresses 302, 312, 313 includes several place names at different geographic levels. At some geographic levels, the place names of one or more of the other street addresses may match the place names of the base address. For example, the base address 302 includes "House 12345" which is an exact match for the house numbers of the second and third street addresses 312, 313. However, the base address 302 then includes "Burnleigh Court" which does not match either "Bernleigh Court" (in the second street address 312) or "Burnley Court" (in the third street address 313). Further, the base address 302 includes "Edgecliff" which is an exact match for the neighborhood of the second street address 312 but not for the neighborhood of the third street address 313. Finally, the base address 302 includes "Sydney" which is an exact match for the municipality of the second street address 312 but not for the municipality of the third street address 313.

Figure 4:
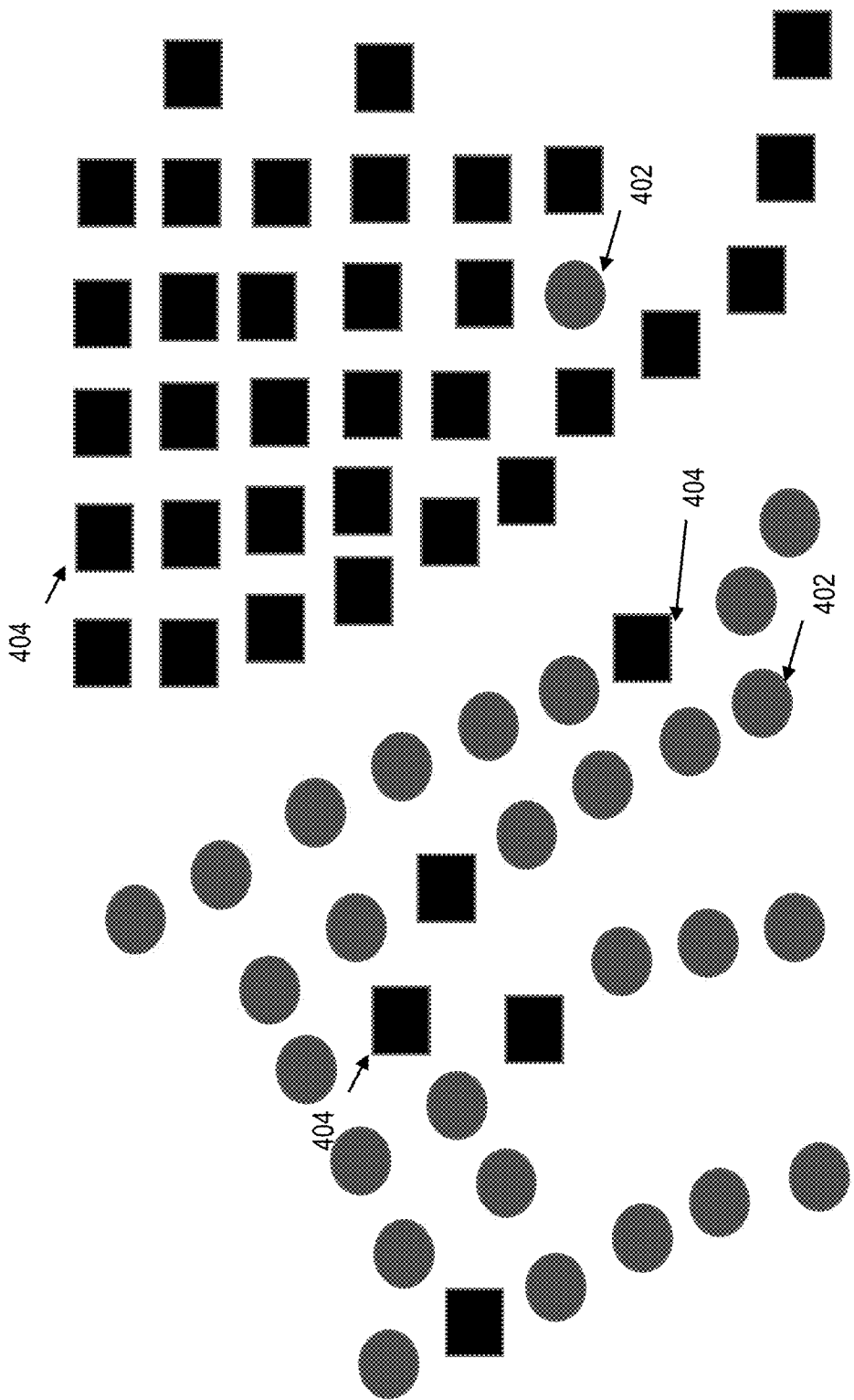
FIG. 4 illustrates addressed premises within overlapping neighborhoods.

Referring now to FIG. 4, however, exact matches are not dispositive. For example, the "Edgecliff" and "Double Bay" neighborhoods 402, 404 of Sydney overlap so that a resident of one neighborhood might mistakenly enter the other neighborhood on a form that is used to generate a street address in the first or second database. Further, while entering the form data there might be an error either of typography or of optical character recognition, such that either "Bernleigh" or "Burnley" might be obtained for an actual place name of "Burnleigh". Additionally, "Sidney" is a common misspelling of "Sydney". Thus, it is not possible to rule out or confirm by simple comparison of place names whether either of the other street addresses 312, 313 is in fact the alias address 314 of the base address 302.

When attempting to find a match for base address 302, the candidate match of the second address 312 can be generated using fuzzy matching techniques. But in some cases, the correct match is Address B (the third address 313) and it can only be generated by substituting of aliases such as Edgecliff for Double Bay, prior to fuzzy matching.

Accordingly, the invention is intended to resolve the problem where a street address might include either a first place name (e.g., "Edgecliff") or a second place name (e.g., "Double Bay"). This problem can occur for a street address 302, 312, or 313 that is located within an overlap of two neighborhoods 402 ("Edgecliff"), 404 ("Double Bay"), as shown by the map of addressed premises in FIG. 4.

The invention resolves the problem of multiple potential place names using a plurality of street addresses and corresponding geographic coordinates that are collected from the first database 300. Given a sufficiently large group of street addresses from the first database, it can be assumed that the plurality of street addresses will contain all the permutations of place names discussed above (i.e., "Burnleigh", "Bernleigh", "Burnley" as well as "Sydney" and "Sidney"). By the expedient of clustering the different place names based on the corresponding geographic coordinates of their respective street addresses, it becomes possible to determine whether certain place names are indeed aliases for other place names.

In other words, we can understand that "Edgecliff" is an alias for "Double Bay" by taking the geographic coordinates of the base address 302 and finding the best matching clusters. A ranked list will be returned with "Edgecliff" and "Double Bay" at the top. The ranked list can be generated from the base coordinates 304 by finding n nearest neighbors of the base coordinates 304 in each place name cluster, then calculating an average distance p_score from the base coordinates 304 to the nearest neighbors. The lower the value of p_score for a given cluster, the better the base coordinates 304 match that cluster. Accordingly, the place name clusters can be ranked based on their p_score values.

The method of ranked lists can be validated to not indicate false matches in case the p_score values of the two "best fit"

clusters differ by more than a pre-determined threshold (e.g., the p_score for the best cluster is 60 meters whereas the p_score for the second best cluster is 600 meters). Such a difference would rule out an alias relationship between the place name of the best cluster and the place name of the second best cluster.

Another mode of validating the "best fit" clusters to be aliases is by calculating the convex hulls CV1, CV2 of a pair of clusters CL1, CL2, then dividing the intersected area of the hulls, area (CV1 n CV2)^2, by the area product of the hulls, area (CV1)*area (CV2). A result closer to 1 indicates a greater likelihood that the two "best fit" clusters correspond to alias place names. A result less than a certain threshold (e.g., less than 0.7) would indicate that the two "best fit" clusters are not likely to correspond to alias place names.

A similar process can be performed for "Sydney" and "Sidney". For example, clustering all of the "Sydney" street addresses and all of the "Sidney" street addresses from the first database, and then validating the clusters as discussed above, may reveal that the geographic coordinates corresponding to these different place names do in fact overlap and interleave so that the place names may be considered interchangeable (aliases to each other). On the other hand, clustering the street addresses of these different place names may reveal that residents of some streets or neighborhoods refer to their municipality as "Sydney" while residents of other streets or neighborhoods prefer "Sidney", so that the two place names are not interchangeable (distinguishing otherwise similar addresses). In either case, data obtained from geographic clustering on the first database 300 enables resolution of potential alias addresses. Then, by substituting aliases, fuzzy matching techniques can now be used to correctly match the base address 302 to the third address 313 from the second database 310.

Figure 5:
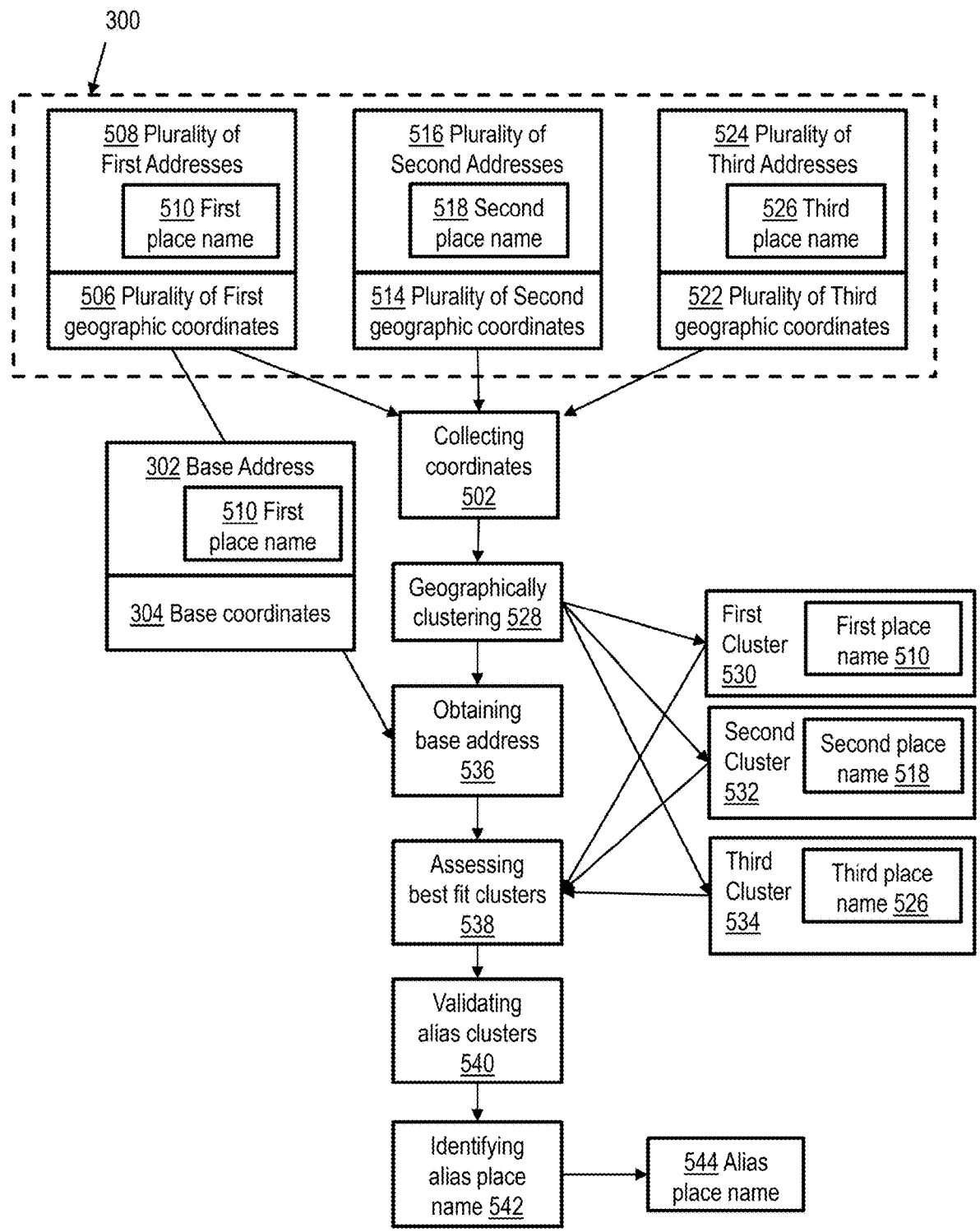
FIG. 5 depicts in flowchart form a method for detecting aliased addresses according to the invention.

Given the discussion thus far, and referring specifically to FIG. 5 in the drawings, it will be appreciated that, in general terms, an exemplary method 500, according to an aspect of the invention, includes the use of clustering to generate place name clusters, a scoring function for choosing the best matching clusters, and a validation step for verifying that two clusters are in fact aliases (cluster similarity measure). Thus, the method 500 includes collecting 502 from a first database 300 a plurality of first geographic coordinates 506 corresponding to a plurality of first addresses 508 that include a first place name 510; collecting 502 from the first database 300 a plurality of second geographic coordinates 514 corresponding to a plurality of second addresses 516 that include a second place name 518; and collecting 502 from the first database 300 a plurality of third geographic coordinates 522 corresponding to a plurality of third addresses 524 that include a third place name 526. Additionally, the exemplary method includes geographically clustering 528 the plurality of first geographic coordinates 506 in at least one first cluster 530; geographically clustering 528 the plurality of second geographic coordinates 514 in at least one second cluster 532; and geographically clustering 528 the plurality of third geographic coordinates 522 in at least one third cluster 534. The exemplary method further includes obtaining 536 from the first database 300 a base address 302 including the first place name 510 and having base coordinates 304; assessing 538 the best fit of the base coordinates 304 to the first, second, and third clusters 530, 532, 534; and based on the two best fit clusters, identifying 542 the second or third place name 518, 526 as an alias place name 544 for the first place name 510.

According to certain implementations of the exemplary method, the clustering 528 makes use of density based clustering algorithms, such as DBScan, that are based on connecting points within defined distance thresholds corresponding to a place name level (e.g., the clusters for a street name such as "Burnleigh" or "Burnley" could be obtained using a distance threshold of 500 meters whereas the clusters for a neighborhood name such as "Edgecliff" or "Double Bay" could be obtained using a distance threshold of 1.5 kilometers). According to particular implementations of the exemplary method, assessing the best fit 538 includes finding n nearest neighbors of the base coordinates within each of the clusters, calculating an average distance from the base coordinates to the n nearest neighbors, and ranking the clusters so that the cluster with the smallest average distance is the best fitting. According to certain embodiments of the invention, identifying 542 an alias place name includes validating 540 that the two best fit clusters are alias clusters by deriving a convex hull of each of the two best fit clusters, calculating an area of each convex hull, calculating an intersected area of the two convex hulls, and calculating the square of the intersected area divided by the product of the convex hull areas, wherein a result closer to 1.0 indicates a greater likelihood that the two best fit clusters are alias clusters. For example, a result greater than 0.7 indicates the two best fit clusters are alias clusters.

Figure 6:
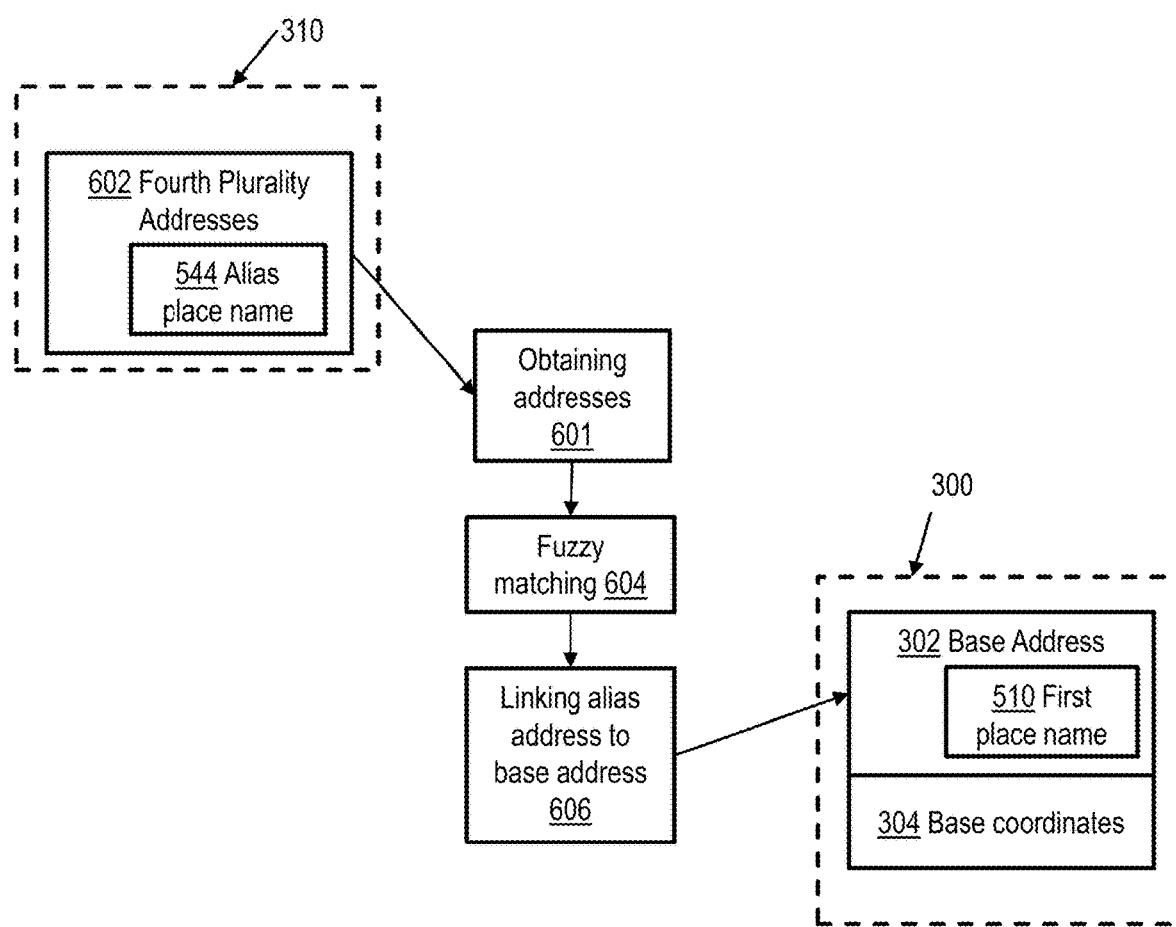
FIG. 6 depicts in flowchart form a method for using aliased addresses to establish a best match between a first address and a plurality of second addresses.

Referring now to FIG. 6, it is apparent that the exemplary method further includes obtaining 601 from a second database 310, which does not include geographic coordinates, a fourth plurality of addresses 602 including the alias place name 544; fuzzy matching 604 the base address 302 to an alias address 314 among the fourth plurality of addresses; and linking 606 the alias address 314 in the second database 310 to the base address 302 in the first database 300, to produce updated versions of the first and second databases. According to certain implementations of the exemplary method, linking the base address to the alias address includes linking the base coordinates to the alias address.

Another implementation of the exemplary method of updating a plurality of databases storing place names includes collecting from a first database a plurality of first geographic coordinates corresponding to a plurality of first addresses including a first place name; collecting from the first database a plurality of second geographic coordinates corresponding to a plurality of second addresses including a second place name; geographically clustering the plurality of first geographic coordinates in at least one first cluster; geographically clustering the plurality of second geographic coordinates in at least one second cluster; calculating convex hulls of the first and second clusters; dividing the square of the intersected area of the convex hulls by the area product of the hulls, and comparing the result to a threshold; in response to the result exceeding the threshold, identifying the second place name as an alias place name for the first place name; obtaining from the first database base geographic coordinates corresponding to a base address including the first place name; obtaining from a second database, which does not include geographic coordinates, a plurality of addresses including the alias place name; fuzzy matching the base address to an alias address among the plurality of addresses including the alias place name; and linking the alias address in the second database to the base address in the first database, to produce updated versions of the first and second databases.

An exemplary embodiment of the invention is a non-transitory computer readable medium including computer executable instructions which when executed by a computer cause the computer to perform any of the exemplary methods above discussed.

Figure 7:
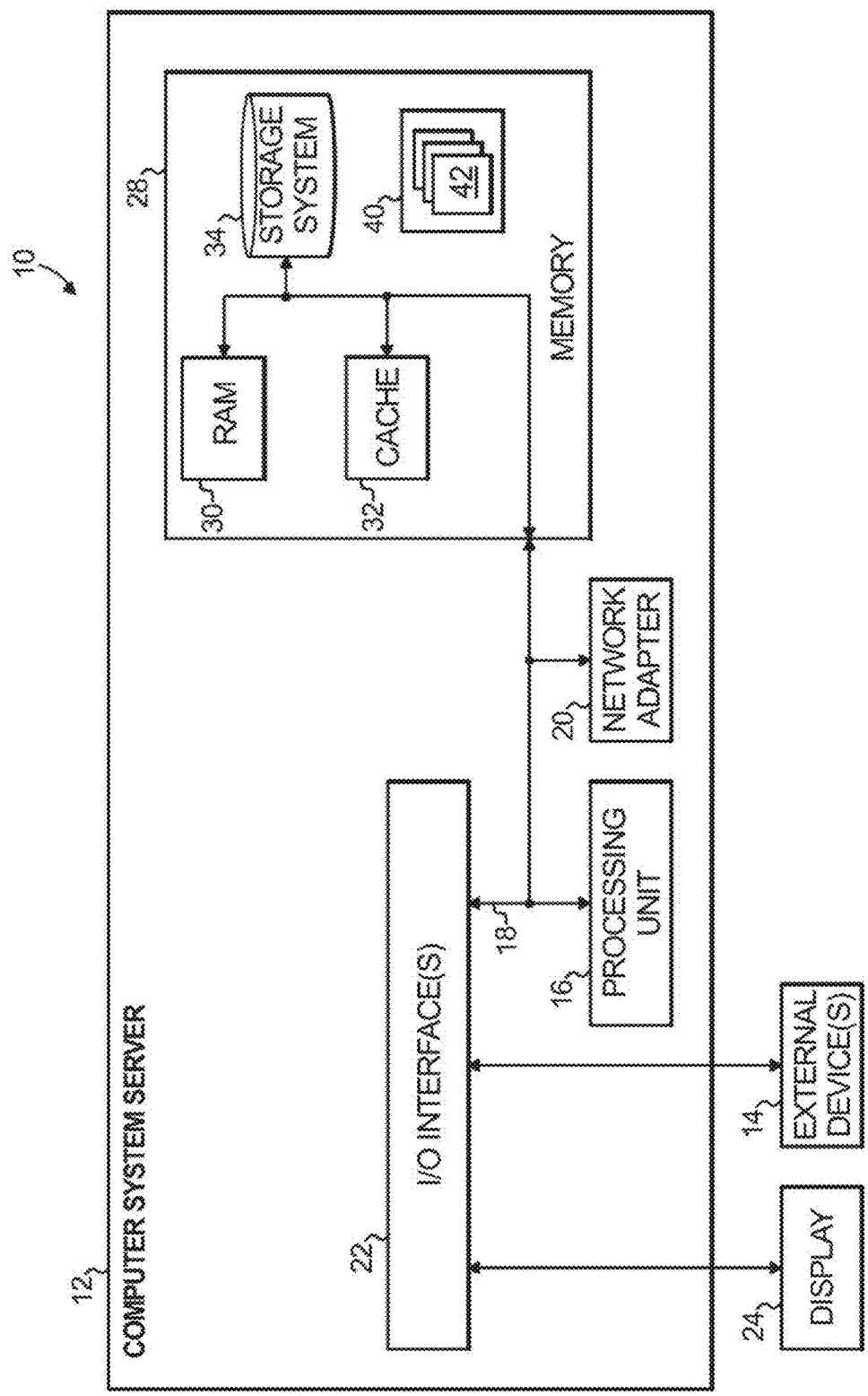
FIG. 7 depicts a computer system for implementing one or more aspects and/or elements of the invention, also representative of a cloud computing node according to an embodiment of the present invention.

One or more embodiments of the invention, or elements thereof, can be implemented in the form of an apparatus including a memory and at least one processor that is coupled to the memory and operative to perform exemplary method steps. FIG. 7 depicts a computer system for implementing one or more aspects and/or elements of the invention, also representative of a cloud computing node according to an embodiment of the present invention. Referring now to FIG. 7, cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 7, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 7) running a server program. It will be understood that such a physical server may or may not include a display and keyboard.

One or more embodiments can be at least partially implemented in the context of a cloud or virtual machine environment, although this is exemplary and non-limiting. Reference is made back to FIGS. 1-2 and accompanying text.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI).

Exemplary System and Article of Manufacture Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A non-transitory computer readable medium comprising computer executable instructions which when executed by a computer cause the computer to perform a method of updating a plurality of databases storing place names, the method comprising:
   collecting from a first database a plurality of first geographic coordinates corresponding to a plurality of first addresses including a first place name;
   collecting from the first database a plurality of second geographic coordinates corresponding to a plurality of second addresses including a second place name;
   collecting from the first database a plurality of third geographic coordinates corresponding to a plurality of third addresses including a third place name;
   geographically clustering the plurality of first geographic coordinates in at least one first cluster;
   geographically clustering the plurality of second geographic coordinates in at least one second cluster;
   geographically clustering the plurality of third geographic coordinates in at least one third cluster;
   obtaining from the first database a base address including the first place name and having base coordinates;
   assessing the best fit of the base coordinates to the first, second, and third clusters;
   based on the two best fit clusters, identifying the second or third place name as an alias place name for the first place name;
   obtaining from a second database, which does not include geographic coordinates, a fourth plurality of addresses including the alias place name;
   fuzzy matching the base address to an alias address among the fourth plurality of addresses;
   producing updated versions of the first and second databases by linking the alias address in the second database to the base address in the first database; and
   storing the updated versions of the first and second databases in a system memory.

2. The medium of claim 1 wherein each step of clustering uses density based clustering based on connecting points within defined distance thresholds corresponding to a place name level.

3. The medium of claim 1 wherein each step of clustering uses an algorithm that does not require the number of clusters to be passed in as a parameter of the algorithm.

4. The medium of claim 1 wherein assessing the best fit includes finding n nearest neighbors of the base coordinates within each of the clusters, calculating an average distance from the base coordinates to the n nearest neighbors, and ranking the clusters so that the cluster with the smallest average distance is the best fitting.

5. The medium of claim 1 wherein identifying an alias place name includes validating that the two best fit clusters are alias clusters by deriving a convex hull of each of the two best fit clusters, calculating an area of each convex hull, calculating an intersected area of the two convex hulls, and calculating the square of the intersected area divided by the product of the convex hull areas, wherein a result closer to 1.0 indicates a greater likelihood that the two best fit clusters are alias clusters.

6. The medium of claim 5 wherein a result greater than 0.7 indicates the two best fit clusters are alias clusters.

7. The medium of claim 1 wherein linking the base address to the alias address includes linking the base coordinates to the alias address.

8. An apparatus comprising:
a memory; and
at least one processor, coupled to said memory, and operative to implement a method of updating a plurality of databases storing place names, the method comprising:
collecting from a first database stored in the memory a plurality of first geographic coordinates corresponding to a plurality of first addresses including a first place name;
collecting from the first database a plurality of second geographic coordinates corresponding to a plurality of second addresses including a second place name;
collecting from the first database a plurality of third geographic coordinates corresponding to a plurality of third addresses including a third place name;
geographically clustering the plurality of first geographic coordinates in at least one first cluster;
geographically clustering the plurality of second geographic coordinates in at least one second cluster;
geographically clustering the plurality of third geographic coordinates in at least one third cluster;
obtaining from the first database a base address including the first place name and having base coordinates;
assessing the best fit of the base coordinates to the first, second, and third clusters;
based on the two best fit clusters, identifying the second or third place name as an alias place name for the first place name;
obtaining from a second database stored in the memory, which does not include geographic coordinates, a fourth plurality of addresses including the alias place name;
fuzzy matching the base address to an alias address among the fourth plurality of addresses;
producing updated versions of the first and second databases by linking the alias address in the second database to the base address in the first database; and
storing the updated versions of the first and second databases in the memory.

9. The apparatus of claim 8 wherein each step of clustering uses density based clustering based on connecting points within defined distance thresholds corresponding to a place name level.

10. The apparatus of claim 8 wherein each step of clustering uses an algorithm that does not require the number of clusters to be passed in as a parameter of the algorithm.

11. The apparatus of claim 8 wherein assessing the best fit includes finding n nearest neighbors of the base coordinates within each of the clusters, calculating an average distance from the base coordinates to the n nearest neighbors, and ranking the clusters so that the cluster with the smallest average distance is the best fitting.

12. The apparatus of claim 8 wherein identifying an alias place name includes validating that the two best fit clusters are alias clusters by deriving a convex hull of each of the two best fit clusters, calculating an area of each convex hull, calculating an intersected area of the two convex hulls, and calculating the square of the intersected area divided by the product of the convex hull areas, wherein a result closer to 1.0 indicates a greater likelihood that the two best fit clusters are alias clusters.

13. The apparatus of claim 8 wherein linking the base address to the alias address includes linking the base coordinates to the alias address.

* * * * *